(12) United States Patent
Forster

(10) Patent No.: US 6,634,317 B1
(45) Date of Patent: Oct. 21, 2003

(54) METHOD FOR DISTRIBUTING ANIMAL FEED AND/OR CLEANING PRODUCTS FROM A MIXING CONTAINER

(76) Inventor: Martin Forster, Gerwigstrasse 25, D-78234 Engen (DE)

(*) Notice: Subject to any disclaimer, the term of this patent is extended or adjusted under 35 U.S.C. 154(b) by 0 days.

(21) Appl. No.: 09/674,040
(22) PCT Filed: Apr. 26, 1999
(86) PCT No.: PCT/EP99/02801
§ 371 (c)(1), (2), (4) Date: Nov. 9, 2000
(87) PCT Pub. No.: WO99/55144
PCT Pub. Date: Nov. 4, 1999

(30) Foreign Application Priority Data

Apr. 24, 1998 (DE) .................................. 198 18 528

(51) Int. Cl.[7] ................................................ A01K 7/00
(52) U.S. Cl. ........................................................ 119/72
(58) Field of Search ........................ 119/72, 51.13, 119/51.01, 51.5, 56.1, 14.18; 222/61, 650, 651; 9/11

(56) References Cited

U.S. PATENT DOCUMENTS

| 3,648,662 | A |   | 3/1972 | Lines |  |
|---|---|---|---|---|---|
| 3,871,711 | A | * | 3/1975 | Rusterholz | 406/50 |
| 4,018,483 | A | * | 4/1977 | Smith | 406/108 |
| 4,118,074 | A | * | 10/1978 | Solt | 406/85 |
| 4,222,346 | A | * | 9/1980 | Reisgies | 119/14.08 |
| 4,366,943 | A | * | 1/1983 | Licary | 119/14.18 |
| 4,452,176 | A | * | 6/1984 | Hoefelmayr et al. | 119/14.17 |
| 4,580,927 | A | * | 4/1986 | Weeks | 406/50 |
| 4,705,433 | A | * | 11/1987 | Brannstrom | 406/63 |
| 4,790,708 | A | * | 12/1988 | von Bennigsen-Mackiewicz et al. | 414/403 |
| 5,522,555 | A | * | 6/1996 | Poole | 241/33 |
| 5,538,160 | A | * | 7/1996 | Ziesel | 137/119.08 |
| 5,636,763 | A | * | 6/1997 | Furness | 222/148 |
| 5,641,094 | A | * | 6/1997 | Wunsch | 222/396 |
| 5,749,316 | A |   | 5/1998 | Deagan |  |
| 6,287,056 | B1 | * | 9/2001 | Szikszay | 406/197 |
| 6,386,800 | B1 | * | 5/2002 | van Eyck | 406/95 |
| 6,484,902 | B1 | * | 11/2002 | Rouse | 221/278 |

FOREIGN PATENT DOCUMENTS

| EP | 0404028 | 12/1990 |
|---|---|---|
| WO | 9212626 | 8/1992 |

* cited by examiner

Primary Examiner—Yvonne Abbott

(57) ABSTRACT

A method and apparatus for selectively transporting one of animal feed and cleaning products from a source via a feed line to a removal location is made possible by selectively feeding in a pulsed manner a gaseous medium.

14 Claims, 4 Drawing Sheets

METHOD FOR DISTRIBUTING ANIMAL FEED AND/OR CLEANING PRODUCTS FROM A MIXING CONTAINER

BACKGROUND OF THE INVENTION

The present invention relates to a method of discharging liquid feed for animals and/or cleaning agent from a mixing container via at least one feed line to a removal location, in particular drinker, feed and/or cleaning agent being conveyed from the mixing container to the removal location, and also to an apparatus for implementing the method.

Such methods are usually used for supplying feed from a mixing container of an automatic drinker via a feed line to a removal location. Such methods are frequently used, in particular, in the feeding and rearing of animals. They are used predominantly for feeding animals such as calves and piglets.

The problem here is that the feed lines and all the components inserted into the feed line, such as valves or pumps, distributors or even the nozzles for discharging liquid feeds become contaminated by the high milk and protein content. Such lines also have to be cleaned very frequently for hygiene reasons.

The cleaning is frequently problematic since feed residues accumulate preferably in the components, but also in the feed line, and deteriorate there. Germs which are undesirable in the feeding of animals are produced.

With use of centrifugal pumps, the pressure decreases when, for example, said pumps are idling. It is then only possible for the remaining feed in the line to be discharged incompletely.

From the prior art, EP 0 404 028 discloses a container which is intended for accommodating feed and is mounted on a trailer. In order to discharge the feed, preferably in the form of a dry feed, the container is assigned a blower. The container can be emptied via said blower.

U.S. Pat. No. 3,648,662 describes a mixing container for mixing dry feed with liquid feed, in which the dry feed is blown upward via a fan and supplied continuously to a liquid with constant stirring. This liquid and ready mixed feed is then led to a removal location directly.

The object of the present invention is to provide a method, and an apparatus for implementing the method, of the type described in the introduction, by means of which, during the discharge of feed and/or cleaning agent, there are no residues of either cleaning agent or feed remaining in the components. Good cleaning of the lines and improved transporting properties of feed are to be ensured without the animal having to be kept away from the drinker or from the removal location.

Furthermore, the intention is for it to be possible for the apparatus to be operated by extremely straightforward means. In particular, production and operating costs are to be reduced considerably.

SUMMARY OF THE INVENTION

The foregoing object is achieved in that, in order for feed and/or cleaning agent to be discharged completely from the feed line and/or removal location, air is supplied to the feed line cyclically.

The present invention makes it possible, by the preferably cyclic introduction of air into a feed line, for residues of feed in the line, when the mixing container is emptied by the feeding operation, to be discharged to the removal location. There, the animal can take in the residues of feed.

The cyclic supply of air into the feed line is advantageous in the present invention. It takes place in individual pulses. Air can be supplied to this line, for example, for a certain adjustable duration, e.g. four seconds. There is then a break of a few seconds, preferably two seconds.

In this time, it is possible for the extremely small droplets of feed remaining in the feed line to accumulate and form into large drops. A further pulse of air then follows. In this way, the accumulated drops of feed can be transported further in the direction of the removal location and discharged there.

As a result, the feed line can be emptied virtually without any residues being left.

Thereafter, there is a break in order for the animals to have enough time to take in the feed remaining in the feed line and now discharged to the removal location.

Then, if desired, a small quantity of cleaning agent, preferably pure water, is supplied to the feed line via the mixing container. This water is preferably preheated, with the result that, on the one hand, a better cleaning action is achieved and, on the other hand, more can be taken in by the animals at the removal location. A small quantity of water is preferably selected, and this is then discharged at the removal location in the above-described manner by means of air being supplied through the feed line, preferably in a cyclic manner. As a result, the mixing container and all the adjoining components, such as pumps, valves, feed line and nozzles or nipples, are cleaned. The remaining feed droplets are bound by the warm water and discharged at the removal location.

The mixing container, pump, valve elements, feed line and removal location are cleaned just with water, without the animals having to be kept away from the removal location.

In order, nevertheless, to clean the components, such as mixing container, feed line, pump and valve elements, with an additional cleaning agent, it is possible to provide on the end side of the feed line a valve which prevents feed from being led on to the removal location and automatically opens an outflow line. In this way, water with added cleaning agent is let out preferably directly upstream of the removal location. This can also take place at individual branch locations of the feed line. In this case, the feed line and pump, mixing container and valve elements are cleaned virtually completely. Cleaning agent may also be discharged in the above-described manner using air. Follow-up cleaning with water then takes place.

If the removal location is likewise intended to be cleaned with cleaning agent, the animals have to be kept away from it. For this purpose, it may be advantageous if the removal location is automatically concealed by means of a covering element and, if appropriate, an outflow line in the trough is opened.

Thereafter, clear water for rinsing is supplied to the mixing container and feed line, said water also being discharged via the cyclic supply of air.

The feed line can be emptied virtually completely in this way.

It is also important, however, in the present invention that the individual operations, the cyclic supply of air, the switching of the valves and the determination of feed quantity and cleaning-fluid quantity, can be freely selected and determined. These can be adjusted precisely by way of a control apparatus of the mixing container. It is thus possible to influence different lengths of feed lines for discharging cleaning agent and feed. As the length of a feed line increases, it is necessary to select longer cycles in which the air is supplied cyclically to the feed line.

It is then also possible to select correspondingly longer breaks, in which the animals at the removal location can take in the rest of the discharged feed. The same also applies to the above-described cleaning process. In this way, it is possible for cleaning programs to be adapted individually to the length of feed line and to removal locations, in order to achieve the best possible cleaning and hygiene.

It has also proven particularly advantageous for the covering element, which is provided for closing the removal location, itself to be designed as a removal location or feed trough. In this case, it is possible to supply feed to the animals when the actual removal location is covered over. During this time, the removal location located therebeneath can be cleaned without the animals trying to open said removal location itself or to damage it as it is closed. The animals are distracted and have access to the newly introduced feed on the covering element. The removal location can thus be closed without difficulty.

BRIEF DESCRIPTION OF THE DRAWINGS

Further advantages, features and details of the invention can be gathered from the following description of preferred exemplary embodiments and with reference to the drawing, in which.

DETAILED DESCRIPTION

Figure 1:
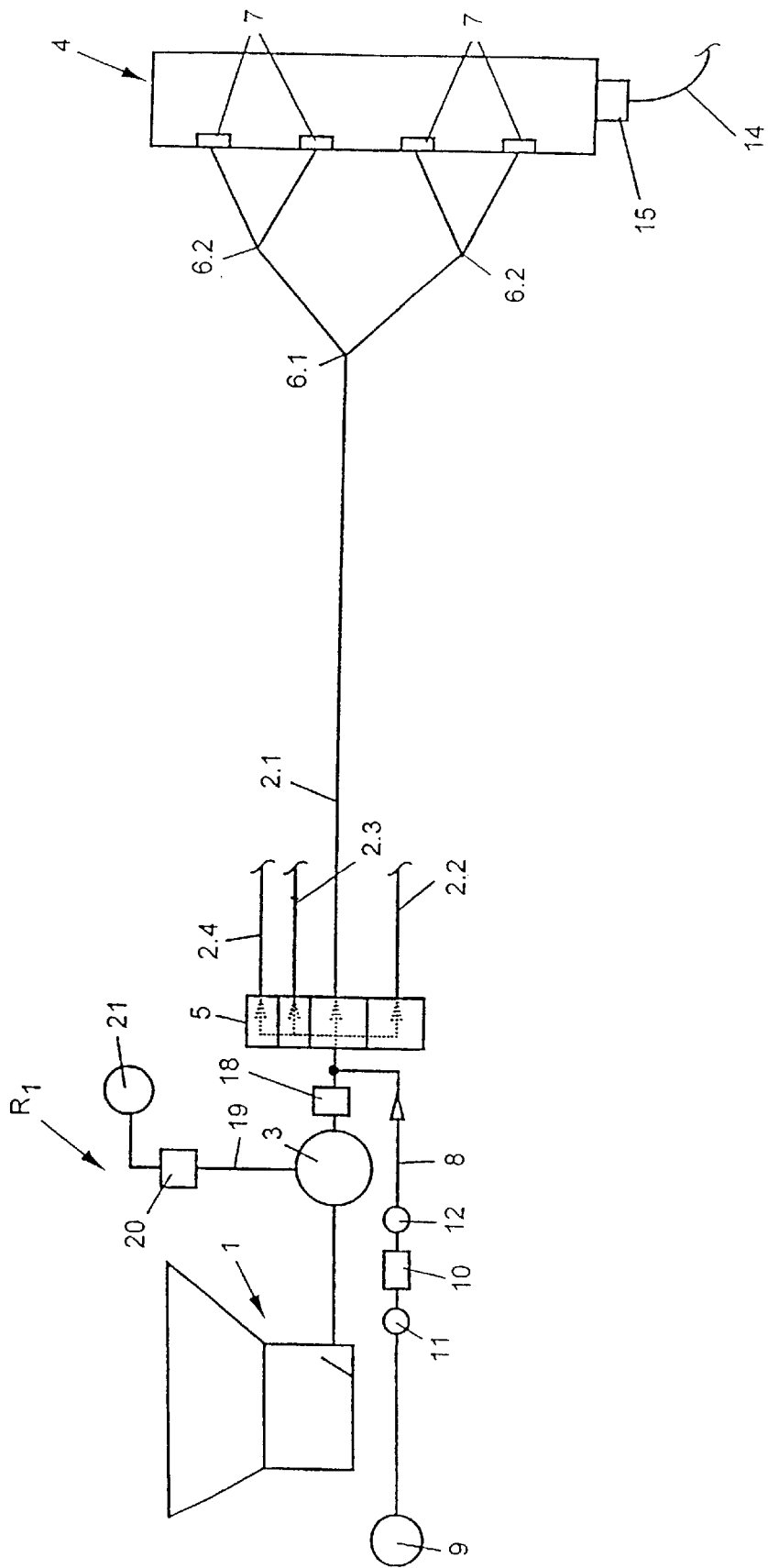
FIG. 1 shows a schematically illustrated plan view of an apparatus according to the invention for providing animals with feed.

According to FIG. 1, an apparatus $R_1$ according to the invention for discharging feed for animals and/or cleaning agent has a mixing container 1 which, in the preferred exemplary embodiment, is adjoined by a feed line 2.1.

Inserted into the feed line 2.1 is a pump 3 for transporting feed from the mixing container 1 via the feed line 2.1 to a removal location 4.

Arranged downstream of the pump 3 is a valve element 5, which may comprise a plurality of individual valves, which are not numbered specially here. Said valve element 5 may have connected to it any desired number of further switchable feedlines 2.2 to 2.4 leading to corresponding removal locations. The valve element 5 and also the pump 3 are preferably constituent parts of the mixing container 1. In order to explain the functioning, the pump 3 and valve element 5 are illustrated outside the container 1. They may, of course, also be located inside, if desired.

The feed line 2.1 opens out into a first branch location 6.1, and the latter, in turn, opens out into two further branch locations 6.2 in each case. These may divide up again into two or more feed lines in each case. This means that feed is distributed and/or divided up uniformly at the removal location 4. The feed is discharged into a trough and/or into the removal location 4 via nozzles 7, which are only indicated here. The animals can take in the feed from said removal location 4. For cleaning with fluid, the trough and/or removal location 4 may be provided with a valve element 15 and an adjoining outflow line 14.

It is also important in the present invention that, upstream of the valve element 5, an air line 8 opens out into the feed line 2.1, said air line being supplied via an air source 9. A non-return valve 18 is arranged directly downstream of the pump 3. It causes air to be directed only in the direction of the outlet openings and/or feed troughs. It is possible for an activatable valve 10, pressure reducer 11 and pressure sensor 12 to be provided in the air line 8. The valve 10 can be automatically actuated via a control apparatus (not illustrated here) of the mixing container 1. The pump 3 and valve element 5 and the air source 9, preferably designed as a compressor, can also be directly activated.

It is also advantageous in the present invention if the pump 3 has connected to it a water line 19, with valve 20 inserted therein, which supplies water into the pump 3 via a water source 21 if necessary. In this case, in order to assist the intake process, a small quantity of water is added to the pump 3 in a controlled manner via the valve 20, with the result that said pump can take in the feed immediately from the container 1. Idling times and increased wear to the pump 3 can be reduced in this way.

Figure 2:
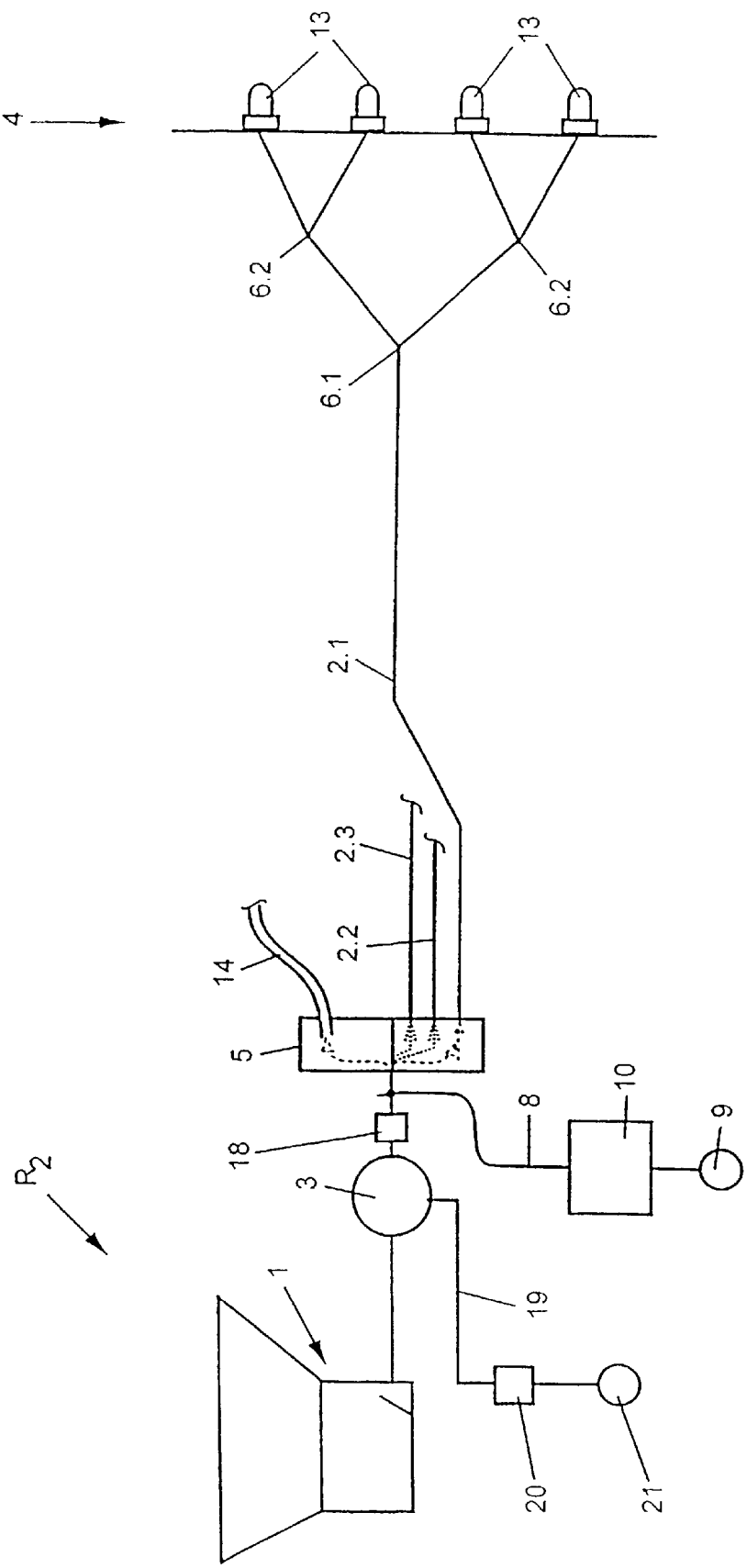
FIG. 2 shows a further exemplary embodiment of the apparatus according to the invention for providing animals with feed.

A correspondingly similar apparatus $R_2$ with similar components is shown in FIG. 2, in which case, instead of the removal location 4 designed as a trough, a removal location 4 is formed from a plurality of nipples 13. Furthermore, an outflow line 14 is assigned to the valve element 5.

Figure 3:
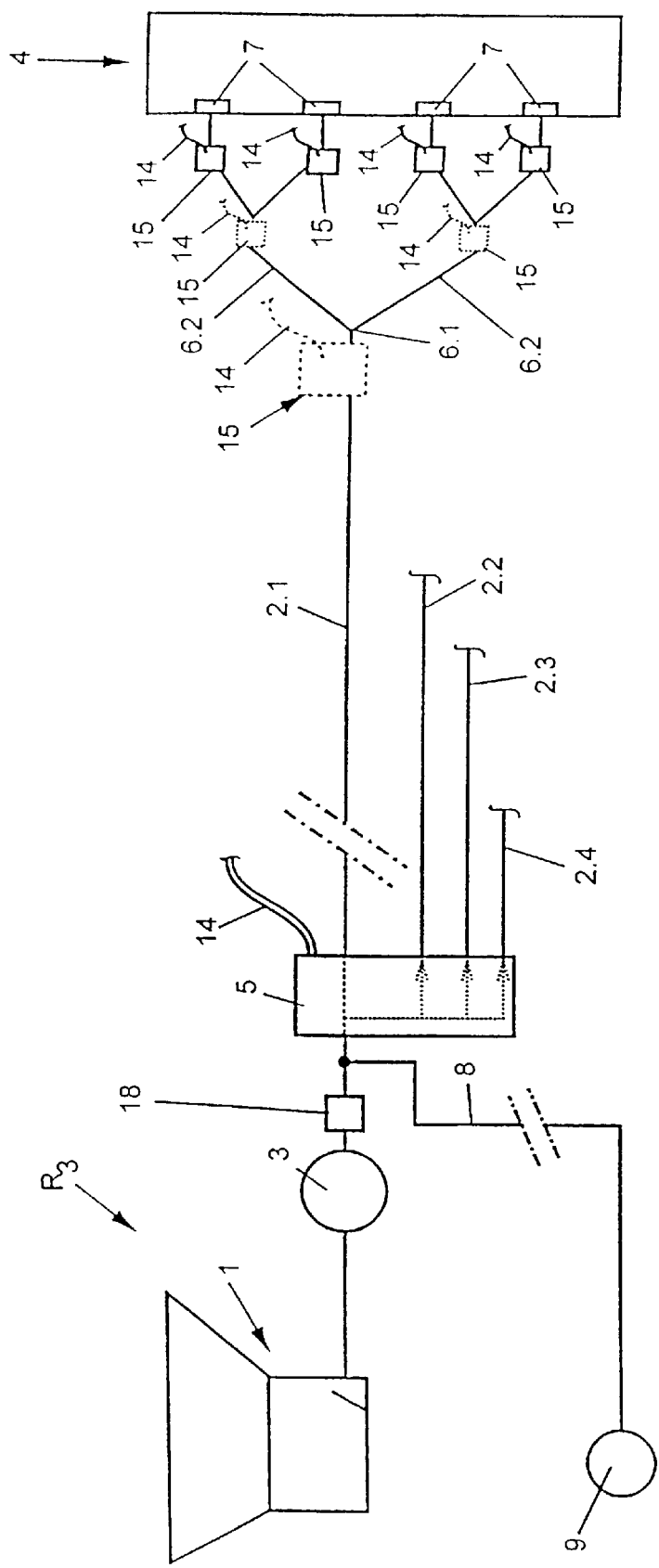
FIG. 3 shows a further exemplary embodiment of the apparatus for providing feed according to FIGS. 1 and 2.

A further exemplary embodiment according to FIG. 3 shows an apparatus $R_3$ which comprises the above-mentioned components. The decisive factor here is that a plurality of switching valves 15 are inserted into the feed lines 2.1 either at the branch location 6.1 and/or 6.2 and/or downstream of the branch locations 6.2 directly upstream of the nozzles 7, outside the removal location 4. A special feature of said automatic and activatable switching valves 15 is that they are all provided with an outflow line 14. Cleaning fluid can be led away, via the same, outside the removal locations.

Figure 4:
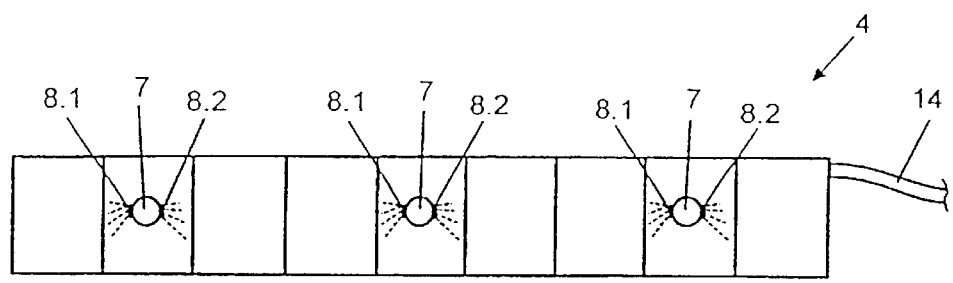
FIG. 4 shows a plan view of a possible removal location as a drinker.

FIG. 4 shows a removal location 4 designed as a trough. A plurality of nozzles 7 are preferably provided in this case, these having two horizontally oriented outlet nozzles 8.1, 8.2. This means that the feed is sprayed out laterally in a uniform manner, with the result that there is no splashing in the outward direction and feed is distributed uniformly in the removal location. In this case, the removal location 4 may be assigned, via an activatable switching valve 15, an outflow line 14 for letting out cleaning agent.

Figure 5:
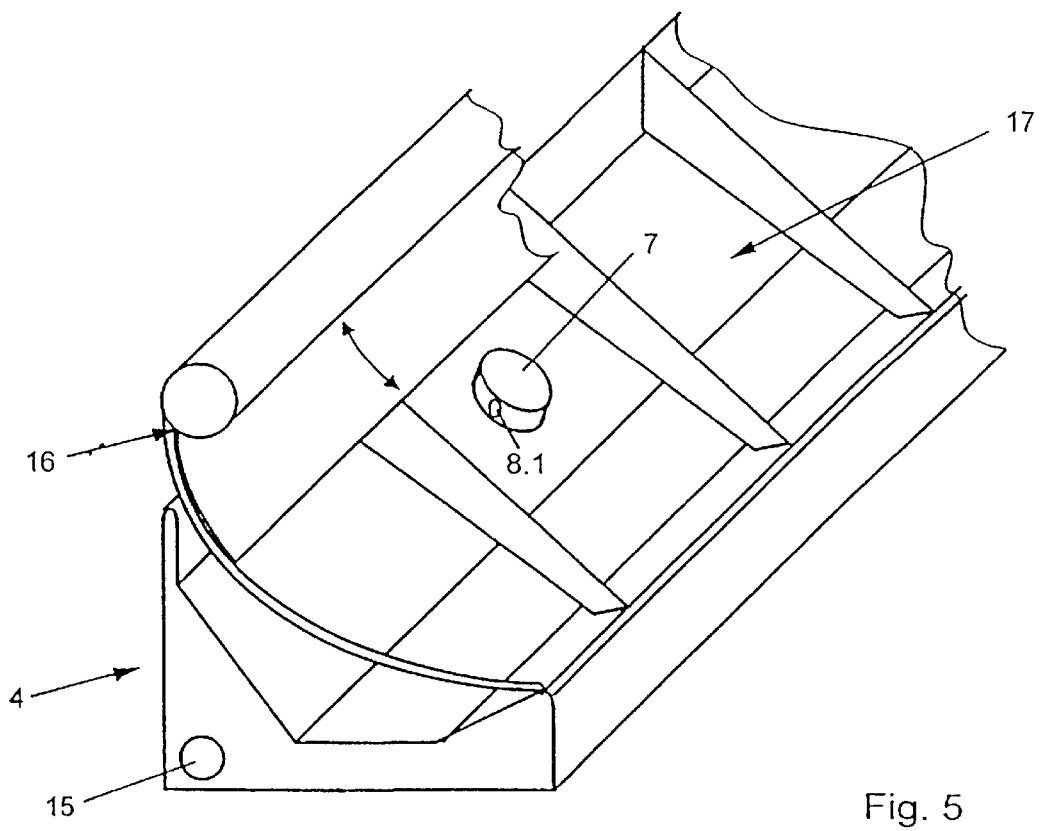
FIG. 5 shows a schematically illustrated side view of the removal location according to FIG. 4.

In order that the animals do not remain at the removal location 4 during the cleaning, in particular if the intention is to use cleaning agent for rinsing purposes, a covering element 16, see FIG. 5, can be moved in front of.an opening 17 of the removal location 4.

The present invention functions as follows:

The feed is stirred in the hot or cold state in a conventional mixing container 1 of an automatic drinker, heated up and discharged via the feed line 2.1, if appropriate with the aid of the pump 3, to a remote removal location 4.

The removal location 4 is accessible to the animals for taking in feed.

A valve element 5, preferably designed as a multivalve block, is inserted into the feed line 2.1 downstream of the pump 3.

According to the invention, following the discharge of feed from the mixing container 1 to the removal location 4, air is supplied to the feed line 2.1 via the valve element 5. In this case, the air is introduced in the direction of the removal location 4 via the air line 8 from a remote air source 9. A non-return valve 18, which is arranged downstream of the pump 3, causes the air to be directed in the direction of the removal location 4. The feed remaining in the feed line 2.1 is conveyed to the removal location 4.

In order that as much of the remaining feed as possible can be discharged from the feed line 2.1 to the removal location 4 by the supply of air from the feed line, the air is supplied cyclically into the feed line 2.1 via the air line 8, if appropriate via the valve element 5. This means that the transportation of feed remaining in the feed line 2.1 is aided by means of the supply of air when, for example, the pump 3 is idling. For example, it is possible via corresponding cycles of preferably 30 seconds, in each case four seconds of air followed by a break of two seconds and another four seconds, for air to be introduced into the feed line 2.1.

It is advantageous here that feed residues or drinker-residue drops remaining in the feed line 2.1 can accumulate during a break.

Following the discharge of feed from the feed line 2.1, cleaning fluid, in particular water, is preferably added to the mixing container 1. A very small quantity of water preheated in the mixing container 1 is preferably selected. The pump 3 is then used to supply said small quantity of clear water to the removal location 4, the supply of water by the supply of air into the feed line 2.1 in the above-described manner, if appropriate cyclically, facilitating the cleaning and discharge of the water to the removal location 4 to a considerable extent. This function can be switched off from the mixing container 1 or automatic drinker if, for example, newly born piglets have to be fed. The piglets must not take in any water during their first few days.

It is also advantageous that, by the supply of air, the water very quickly and effectively cleans the feed line 2.1 and detaches remaining feed residues and supplies them to the removal location 4.

Also covered by the present invention is the fact that the mixing container 1 has added to it a cleaning fluid which is transported through the feed line 2.1 to the removal location 4 via the pump 3 and the valve element 5. It may likewise be transported, as described above, by the cyclic supply of air at intervals. The entire feed line 2.1 is cleaned very effectively as a result.

It is also possible for the small section between the mixing container 1, pump 3 and valve element 5, as is illustrated in FIG. 2, to be cleaned directly or separately. For this purpose, cleaning fluid is supplied to the mixing container 1 and discharged into the valve element 5 via the pump 3, the cleaning fluid being led away from there via an outflow line 14.

The supply of air can be activated, regulated and determined by controllable solenoid valves, pressure sensors and pressure reducers.

It is also advantageous in the present invention that just part of the feed line 2 between, for example, the mixing container 1 and branch location 6.1 can be cleaned via separate switching valves 15, which may be arranged at branch locations 6.1, 6.2. The switching valves 15 are then each assigned on outflow line 14. If, then, for example the feed line 2.1 is cleaned with cleaning agent, then, by virtue of the switching valve 15 being closed, the outflow line 14 can be opened in order for the cleaning agent to be led away upstream of the removal location 4. In this way, the cleaning agent, which is harmful to animals, can be led away directly before it reaches the removal location 4.

The switching valve 15 can be activated centrally from the mixing container 1 or else in a decentralized manner. It is thus possible to switch the switching valve 15 in the very close vicinity of the removal location 4 and to clean the entire feed line 2.1 right up to the removal location 4 with cleaning agents which cannot be digested by the animals.

Should it also be necessary to clean the removal location 4 itself, then a covering element 16 will close a corresponding opening 17 of the removal location 4. The closure operation may likewise take place in an automatically controllable manner from the mixing container 1. Closure of the opening 17 is necessary when harmful cleaning agents are used here in order to clean the nozzles 7 or nipples 13. In this case, the removal location 4, preferably designed as a trough, is connected to an outflow line 14 which can automatically be opened. It is thus possible for the removal location 4 to be directly automatically activated and closed and for an outflow line 14 to be opened. Cleaning of the removal location 4 and subsequent rinsing with pure water is thus facilitated to a considerable extent.

It has also proven particularly advantageous to design the covering element 16 itself as the removal location, in order that the animals are distracted from the actual removal location 4. It is then possible for further feed to be introduced there. This also prevents the animals from attempting to remove the covering element from the removal location and, possibly, destroy the same.

The animals can be distracted from the actual feed container by the covering element, which is additionally designed as a removal location. While the covering element 16 performs a covering-over function, the removal location 4, located therebeneath, can then be cleaned without obstruction. This advantageous configuration of the covering element 16 as an independent removal location thus has considerable advantages, for which reason protection is sought separately therefor.

What is claimed is:

1. A method for discharging a liquid animal nutritional feed from a removal location comprising the steps of;
    (a) providing a source of a liquid animal nutritional feed;
    (b) feeding the liquid animal nutritional feed from the source to a removal location via a feed line, the feeding step comprising supplying a gaseous medium in a pulsed manner to one of the feed line and the source; and
    (c) after step (b), feeding a quantity of cleaning agent to the feed line by means of pulsed air.

2. Method according to claim 1, wherein the gaseous medium is supplied to the feed line intermittently.

3. Method according to claim 1, wherein the cleaning agent is conveyed to the removal location by supplying air into the feed line.

4. Method according to claim 3, wherein the cleaning agent is expelled at the removal location by the pulsed supply of air into the feed line.

5. Method according to claim 3, wherein the cleaning agent is in a quantity between about 30 and 1000 ml and the cleaning agent is heated prior to being supplied to the feed line.

6. Method according to claim 3, wherein the removal location is closed and the liquid is removed via a discharge line from the feed line at a point between the source and the removal location.

7. Method according to claim 3, including closing the removal location prior to conveying the liquid to the feed line.

8. An apparatus for discharging a liquid animal nutritional feed from a removal location comprising:
    a source of a liquid animal nutritional feed; a removal location; a feed line between the source and the removal location; a source of a gaseous medium; first means for selectively feeding the gaseous medium in a pulsed manner to one of the source of the liquid animal nutritional feed and the feed line for discharging the liquid animal nutritional feed from the removal location; a source of cleaning agent; and second means for selectively feeding the cleaning agent to the feed line.

9. Apparatus according to claim 8, wherein the first means and the second means are the same means and comprises a pump which communicates with a non-return valve.

10. Apparatus according to claim 8, wherein the means includes an air line which terminates in the feed line between a valve element and the source of liquid animal nutritional feed.

11. Apparatus according to claim 10, wherein an automatically actuatable outlet line is associated with at least one of the source of liquid animal nutritional feed the valve element and the removal location.

12. Apparatus according to claim 8, including means for closing the removal location during the automatic cleaning with cleansing agent.

13. Apparatus according to claim 12, including feeding cleansing agent to the feed line when the removal location is closed.

14. Apparatus according to claim 8, including a controllable pilot valve is associated in the feed line between the source of liquid animal nutritional feed and the removal location.

* * * * *